United States Patent
McBrearty et al.

(10) Patent No.: US 6,966,051 B2
(45) Date of Patent: Nov. 15, 2005

(54) AUTOMATICALLY GENERATED SYMBOL-BASED DEBUG SCRIPT EXECUTABLE BY A DEBUG PROGRAM FOR SOFTWARE DEBUGGING

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 09/864,109

(22) Filed: May 24, 2001

(65) Prior Publication Data

US 2004/0015863 A1 Jan. 22, 2004

(51) Int. Cl.$^7$ ................................. G06F 9/44
(52) U.S. Cl. ................. 717/124; 717/133; 717/141
(58) Field of Search .................... 717/124; 714/35, 714/25, 37; 712/227

(56) References Cited

U.S. PATENT DOCUMENTS

| | | | | |
|---|---|---|---|---|
| 5,093,914 | A * | 3/1992 | Coplien et al. ............. | 717/129 |
| 5,583,988 | A * | 12/1996 | Crank et al. ................. | 714/48 |
| 5,794,046 | A * | 8/1998 | Meier et al. ................ | 717/128 |
| 5,881,219 | A * | 3/1999 | Leung et al. ................ | 714/31 |
| 5,909,581 | A * | 6/1999 | Park ........................... | 717/170 |
| 5,956,479 | A * | 9/1999 | McInerney et al. ........... | 714/38 |
| 5,956,512 | A * | 9/1999 | Simmons et al. ............ | 717/128 |
| 6,058,393 | A * | 5/2000 | Meier et al. ................. | 707/10 |
| 6,088,803 | A * | 7/2000 | Tso et al. .................... | 713/201 |
| 6,161,216 | A * | 12/2000 | Shagam ....................... | 717/128 |
| 6,182,285 | B1 * | 1/2001 | Bleizeffer et al. ........... | 717/170 |
| 6,249,907 | B1 * | 6/2001 | Carter et al. ................ | 717/129 |
| 6,275,956 | B1 * | 8/2001 | On et al. ..................... | 717/125 |
| 6,324,683 | B1 * | 11/2001 | Fuh et al. .................... | 717/124 |
| 6,363,499 | B1 * | 3/2002 | Delo et al. ................... | 717/15 |
| 6,412,106 | B1 * | 6/2002 | Leask et al. ................. | 717/124 |
| 6,438,749 | B1 * | 8/2002 | Chamberlain ................ | 717/174 |
| 6,502,102 | B1 * | 12/2002 | Haswell et al. ............. | 707/102 |
| 6,591,358 | B2 * | 7/2003 | Jaffrey ........................ | 712/32 |
| 6,618,856 | B2 * | 9/2003 | Coburn et al. .............. | 717/135 |
| 6,662,355 | B1 * | 12/2003 | Caswell et al. ............. | 717/103 |
| 6,732,353 | B1 * | 5/2004 | Bloom et al. ............... | 717/103 |
| 6,769,113 | B1 * | 7/2004 | Bloom et al. ............... | 717/103 |
| 6,789,252 | B1 * | 9/2004 | Burke et al. ................ | 717/100 |
| 6,854,016 | B1 * | 2/2005 | Kraenzel et al. ............ | 709/229 |

OTHER PUBLICATIONS

Borland Turbo Debugger, 1991. pp. 119, 141-147, 239, 302-309, 358-359, 374-378, 387-390, 394-395, 421, 423 and 426.*

Compilers Principles, Techniques and Tools, Aho et al, Sep. 12, 1985, pp. 429-440.*

"A Dynamic Software Tool for Debugging asynchronous distributed algorithms on loosley coupled parallel processors", 1 page, 1993, Journal of Sysmtems and Software, v22, n1.*

Borland Turbo Debugger version 2.5, pp. 97-98, 1991.*

* cited by examiner

*Primary Examiner*—Todd Ingberg
(74) *Attorney, Agent, or Firm*—Duke W. Yee; Herman Rodriguez; Theodore D. Fay, III

(57) ABSTRACT

A method, system, and product are disclosed for automatically generating a symbol-based debug script, which is executable by a debug program, for debugging a software program. Function symbols included in the software program are identified. The functions represented by the function symbols may be executed during an execution of the software program. A debug script is then automatically generated which, when executed by a debug program, will record each one of the functions symbols which represent a function called by the software program during execution of the software program by the debug program.

26 Claims, 3 Drawing Sheets

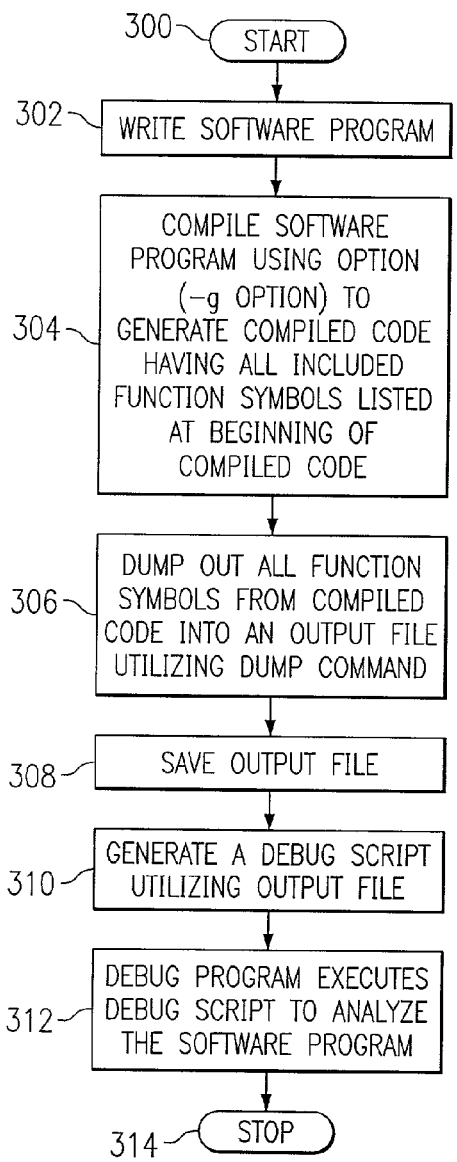
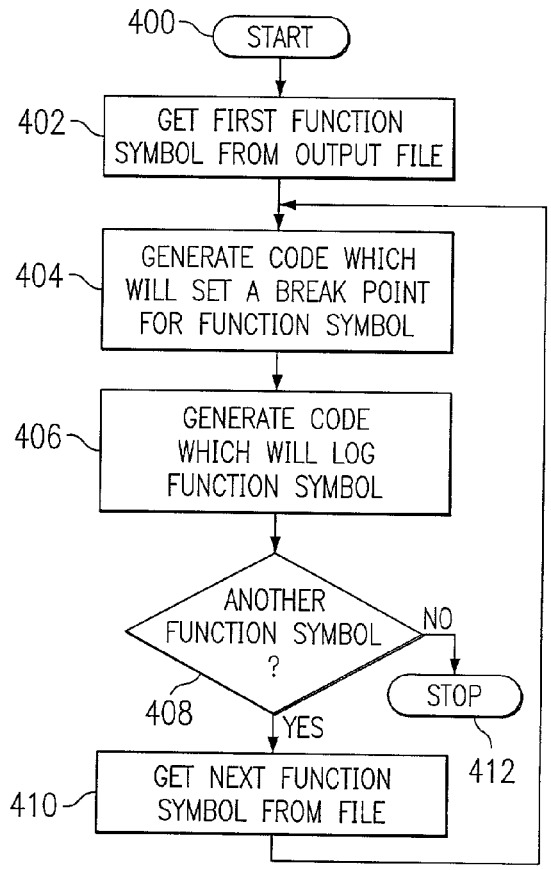

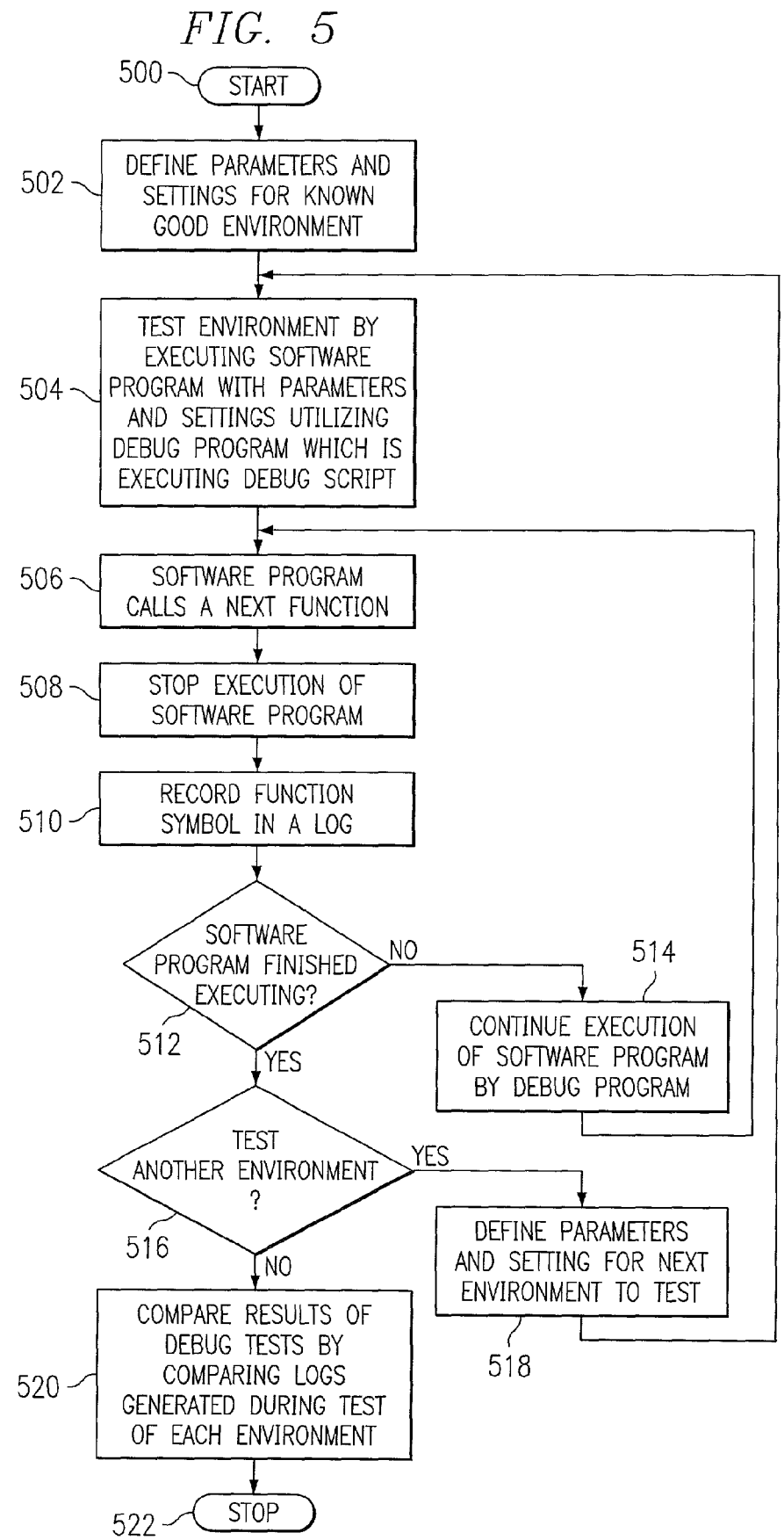

AUTOMATICALLY GENERATED SYMBOL-BASED DEBUG SCRIPT EXECUTABLE BY A DEBUG PROGRAM FOR SOFTWARE DEBUGGING

BACKGROUND OF THE INVENTION

1. Technical Field

The present invention relates generally to the field of computer systems and, more specifically to computer systems including a method, system, and product for automatically generating a symbol-based debug script which is executable by a debug program for debugging a software program.

2. Description of Related Art

New programs created by a user often include one or more inadvertent errors. Locating and removing the errors in a program is generally known in the industry as "debugging" the program, with errors being referred to as "bugs".

Debugging a program can be difficult and time-consuming. In the prior art of debugging a program, a user may first read the program line-by-line to try and locate the errors. Following the flow of a program by reading it line-by-line is difficult, even for a relatively simple program.

Because debugging programs by reading them is so difficult, software debug commands executed by a software debug program may be utilized. Debug commands may be executed on the program and the user may observe the results as an aid to locate and correct any errors. For example, a user may go through the software program to be debugged and the user may insert a breakpoint in the program to halt execution whenever the line on which the breakpoint is set is encountered. The debug commands may then be executed on the user's program. In this example, the program will execute until a breakpoint is encountered. The execution of the program then will be stopped. The user may check register and other values after the breakpoint is encountered in order to evaluate the execution of the user program. This procedure is also very time-consuming when the software to be debugged is more than a few lines of code.

The problem of debugging user programs is magnified when software engineers are required to isolate and solve problems which occur in vast amounts of code with which the engineers have little or no previous experience. Often, standard regression tests written for the code may run successfully, but have a failure when the software is executed with slightly different parameters or environment settings.

A software program typically includes parameters which may be set by a user prior to executing the software program. The software program may execute correctly when a standard set of parameters is utilized, and thus, the standard regression tests may run successfully. The same software program may execute incorrectly when a slightly different set of parameters is utilized. Thus, the software engineer may be faced with a difficult problem which must be solved in a short amount of time.

Therefore, a need exists for a method, system, and product for automatically generating a debug script which is executable by a debug program for debugging a user's software program.

SUMMARY OF THE INVENTION

The present invention is a method, system, and product for automatically generating a debug script which is executable by a debug program and used to debug a software program. The debug script automatically inserts breakpoints into the user's program. When a breakpoint is encountered during the execution of the program, the last function to be called is recorded in a log file along with one or more return codes. In this manner, the log file records the order in which the software program executed along with the various return values. In this manner, a software engineer may locate and correct bugs in the user program utilizing the debug program which is executing the debug script.

First, the user program is executed utilizing an environment including parameters which are known to result in the software program executing properly. A first log is produced during the execution of the user program using the known, good environment which indicates the order in which the user program executed when the program executed properly and which includes the return codes which are returned when the program executes correctly. The first log will include each function symbol, or function call, which represents each function executed by the user program as well as one or more return codes. Further, these function symbols will appear in the log in the order in which their corresponding functions were executed. Thus, the first log includes an example of one correct order of execution of the user program and the return codes which are returned when the program executes correctly. Next, the user program is executed utilizing a second environment with parameters which are known to result in the software program executing incorrectly. A second log is then produced during the execution of the user program using the second environment which indicates the order in which the user program executed when the program did not execute properly and which includes the return codes which were returned. Finally, the software engineer may then compare the two logs to analyze any differences which occur in the order of execution of the functions and any differences in the return codes. In this manner, the software engineer may determine where the second log varied from the first log and may use this information in order to isolate the bugs which are causing the user program to execute incorrectly using the second environment.

The debug script automatically inserts a breakpoint into the user program to halt the execution of the user program after the program executes a function which is represented by each function symbol included in the user program. A function symbol may also be called a function call. Software programs include human readable function symbols which represent functions which may be called by the software program when the software program is executed. When each function is executed by the user program, the breakpoint inserted by the debug script for the function symbol which represents the function will halt execution of the user program, and record the function symbol in a log. The user program then continues execution until another function is encountered. In this manner, when the user program has finished executing, the log will include each function symbol which represents each function which was executed by the user program, as well as the order in which these functions were executed.

In order to generate a debug script which inserts breakpoints for each function symbol, the present invention first identifies all of the function symbols included in the user program. One method for identifying function symbols is to compile the software program utilizing an execution option which will include a listing of all of the function symbols grouped together in the compiled code. These function symbols may then be dumped out from the compiled code into a file.

The debug script is then automatically generated by retrieving the first function symbol from the file, inserting the function symbol into code which sets a breakpoint when this function symbol is encountered, generating code which will log this function symbol, and generating code which will cause the user program to continue executing. Therefore, when a function is called by the software program during debugging, the debug script will halt the execution of the software program utilizing the breakpoint, the function's corresponding function symbol will be recorded in the log, and the execution of the software program will be then continued.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a high level flow chart which depicts the debugging of a software program utilizing a debugger which is executing an automatically generated script in accordance with the present invention;

FIG. 4 is a high level flow chart which illustrates the generation of a debug script which may be executed by a debug program to analyze the execution of a software program in accordance with the present invention; and FIG. 5 is a high level flow chart which depicts a debug program executing the debug script in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

Figure 1:
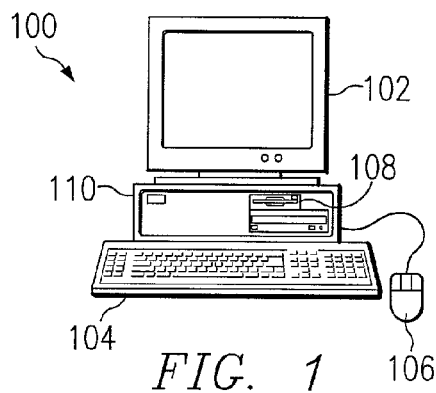
FIG. 1 is a pictorial representation which depicts a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
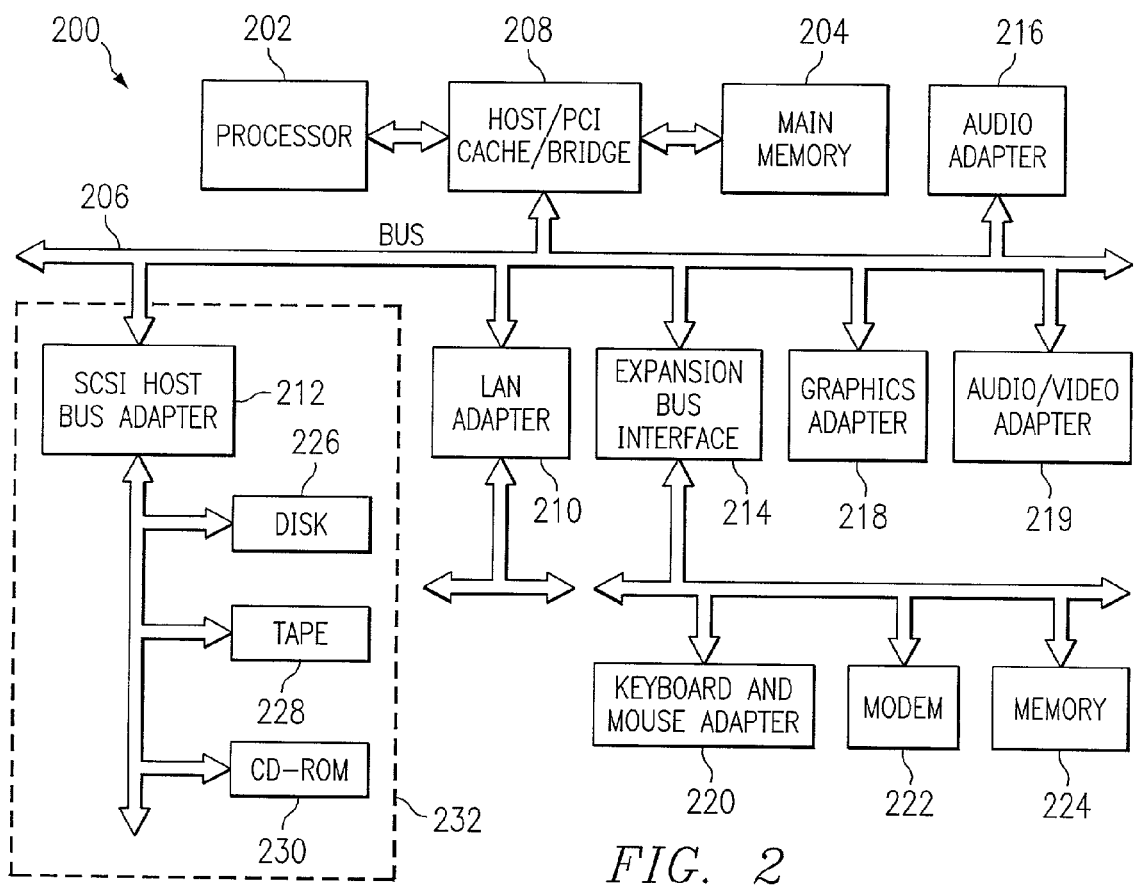
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

FIG. 3 is a high level flow chart which depicts the debugging of a software program utilizing a debugger which is executing an automatically generated script in accordance with the present invention. The process starts as depicted by block 300 and thereafter passes to block 302 which illustrates the writing of a software program. Next, block 304 depicts the compilation of the software program utilizing the option necessary to generate compiled code having all of the function symbols which are included in the software program grouped together in the compiled code. For example, when compiling C code, the "-g" option will generate compiled code having all of the function symbols listed together at the beginning of the compiled code.

Thereafter, block 306 depicts dumping out all of the function symbols from the saved compiled code into an output file. For example, the UNIX command, "dump-lvt", will output all of the function symbols which were listed at the beginning of the compiled code. Next, block 308 illustrates saving the output file. The process then passes to block 310 which depicts generating a debug script utilizing the output file. The process for generating a debug script is described more fully with reference to FIG. 4. Block 312, then, illustrates a debug program executing the debug script to analyze the software program. The process of executing the debug script by the debug program is more fully described with reference to FIG. 5. The process then terminates as depicted by block 314.

FIG. 4 is a high level flow chart which illustrates the generation of a debug script which may be executed by a debug program to analyze the execution of a software program in accordance with the present invention. The process starts as depicted by block 400 and thereafter passes to block 402 which illustrates getting a first function symbol from the output file. Next, block 404 depicts the generation of code which will set a breakpoint for this function symbol so that the execution of the software program by the debug program will stop when the function represented by this function symbol is called by the software program. The process then passes to block 406 which illustrates the generation of code which will record this function symbol in a log. Next, block 408 depicts a determination of whether or not another function symbol exists in the output file. If there are more function symbols in the output file, the process passes to block 410 which illustrates getting the next function symbol from the output file. The process then passes back to block 404. Referring again to block 408, if a determination is made that no more function symbols exist in the output file, the process terminates as illustrated by block 412.

FIG. 5 is a high level flow chart which depicts a debug program executing the debug script in accordance with the present invention. The process starts as depicted by block 500 and thereafter passes to block 502 which illustrates setting parameters and settings for a known good environment. The term "environment" is used herein to mean the software program executing with a particular set of parameters and settings, where the software program is known to execute correctly with these settings and parameters. Next, block 504 depicts testing this environment by executing the software program with the particular settings and parameters utilizing the debug program which is executing the debug script. Block 506, then, illustrates the software program calling a next function during execution of the software program by the debug program. Thereafter, block 508 depicts the debug script stopping the execution of the software program. The process then passes to block 510 which illustrates the debug script recording this function symbol in a log.

Block 512, then, depicts a determination of whether or not the software program has finished executing under the control of the debug program. If a determination is made that the software program has not finished executing under the control of the software program, the process passes to block 514 which illustrates the continuation of the execution of the software program by the debug program. The process then passes back to block 506.

Referring again to block 512, if a determination is made that the software program has finished executing under the control of the debug program, the process passes to block 516. Block 516 depicts a determination of whether or not to test another environment. If a determination is made that another environment is to be tested, the process passes to block 518 which illustrates defining parameters and settings for the next environment to be tested. The process then passes back to block 504.

Referring again to block 516, if a determination is made that no more environments are to be tested, the process passes to block 520 which depicts comparing the results of the debug tests by comparing the logs generated during the test of each environment. The process then terminates as illustrated by block 522.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of debugging a software program whose execution flow is responsive at least in part to a first set of options, said method executed on a data processing system, said method comprising the steps of:
   generating a first log file by executing said program with said first set of options, said first log file including an indication of all functions executed by said program during this first execution, said first log file stored in a computer readable medium;
   modifying at least one of the first set of options, and then generating a second log file by executing said program with said modified first set of options, said second log file including an indication of all functions executed by said program during this second execution, said second log file stored in a computer readable medium; and
   comparing said first log file with said second log file to debug the software program.

2. The method according to claim 1, further comprising the steps of:
   generating said first log file including a first set of return codes;
   generating said second log file including a second set of return codes; and
   comparing said first set of return codes with said second set of return codes to debug the software program.

3. The method according to claim 1, further comprising the steps of:
   compiling said software program to generate compiled code, said compiled code including a listing of said functions;
   generating a file including said listing obtained from said compiled code; and
   generating a debug script utilizing said file.

4. The method according to claim 3, further comprising the step of compiling said software program utilizing a C compiler and utilizing a "-g" option, said "-g" option generating said listing of said function.

5. The method according to claim 3, further comprising the step of utilizing a UNIX dump command to generate said file, said UNIX dump command causing an output of said listing.

6. The method according to claim 1, further comprising the steps of:
   automatically generating a debug script including the steps of:
   generating script code for each of a plurality of function calls included in said software program, said script code setting a breakpoint at each of said plurality of function calls;
   generating script code which logs each of a plurality of said plurality of functions calls executed by said software program when said software program is executed under the control of said debug program; and
   generating script code which causes execution of said software program to continue after each of said plurality of said plurality of function calls is logged.

7. A computer program product in a computer readable medium, said computer program product for debugging a software program whose execution flow is responsive at least in part to a first set of options, said computer program product comprising:
   instruction means for generating a first log file by executing said program with said first set of options, said first log file including an indication of all functions executed by said program during this first execution;
   instruction means for modifying at least one of the first set of options, and then generating a second log file by executing said program with said modified first set of options, said second log file including an indication of all functions executed by said program during this second execution; and
   instruction means for comparing said first log file with said second log to debug the software program.

8. The product according to claim 7, further comprising:
   instruction means for generating said first log file including a first set of return codes;
   instruction means for generating said second log file including a second set of return codes; and
   instruction means for comparing said first set of return codes with said second set of return codes to debug the software program.

9. The product according to claim 7, further comprising:
   instruction means for compiling said software program to generate compiled code, said compiled code including a listing of said functions;
   instruction means for generating a file including said listing obtained from sai compiled code; and
   instruction means for generating a debug script utilizing said file.

10. The product according to claim 9, further comprising instruction means for compiling said software program utilizing a C compiler and utilizing a "-g" option, said "-g" option generating said listing of said function.

11. The product according to claim 9, further comprising instruction means for utilizing a UNIX dump command to generate said file, said UNIX dump command causing an output of said listing.

12. The product according to claim 7, further comprising:
   instruction means for automatically generating a debug script including:
   instruction means for generating script code for each of a plurality of function calls included in said software program, said script code setting a breakpoint at each of said plurality of function calls;
   instruction means for generating script code which logs each of a plurality of said plurality of functions calls executed by said software program when said software program is executed under the control of said debug program; and
   instruction means for generating script code which causes execution of said software program to continue after each of said plurality of said plurality of function calls is logged.

13. A system for debugging a software program whose execution flow is responsive at least in part to a first set of options, comprising:
   a first log file being generated by executing said program with said first set of options, said first log file including an indication of all functions executed by said program during this first execution, said first log file in a computer readable medium;
   a second log file being generated by executing said program with a modified first set of options, said second log file including an indication of all functions executed by said program during this second execution, said second log file in a computer readable medium; and means for comparing said first log file with said second log file to debug the software program, said means in a data processing system.

14. The system according to claim 13, further comprising:
said first log file being generated including a first set of return codes;
said second log file being generated including a second set of return codes; and
means for comparing said first set of return codes with said second set of return codes to debug the software program.

15. The system according to claim 13, further comprising:
said software program being compiled to generate compiled code, said compiled code including a listing of said functions;
a file being generated including said listing obtained from said compiled code; and
a debug script being generated utilizing said file.

16. The system according to claim 15, further comprising said software program being compiled utilizing a C compiler and utilizing a "-g" option, said "-g" option generating said listing of said function.

17. The system according to claim 15, further comprising a UNIX dump command being utilized to generate said file, said UNIX dump command causing an output of said listing.

18. The system according to claim 13, further comprising:
a debug script being automatically generated including:
script code being generated for each of a plurality of function calls included in said software program, said script code setting a breakpoint at each of said plurality of function calls;
script code being generated which logs each of a plurality of said plurality of functions calls executed by said software program when said software program is executed under the control of said debug program; and
script code being generated which causes execution of said software program to continue after each of said plurality of said plurality of function calls is logged.

19. A method of debugging a software program, said method executed on a data processing system, said method comprising the steps of:
analyzing said software program to determine a listing of executable functions in the software program;
generating a file including said listing of executable functions, said file stored in a computer readable medium; and
generating a debug script for a debug program utilizing said file, said script stored in a computer readable medium.

20. The method of claim 19, wherein the step of generating a debug script comprises:
utilizing said file, including said listing of executable functions, to generate script code which logs executable functions executed by said software program when said software program is executed under the control of said debug program.

21. The method of claim 20, further comprising:
setting at least one parameter used by the software program;
executing said software program using said debug script to generate a first log file;
changing the at least parameter and then re-executing said software program using said debug script to generate a second log file; and
comparing said first log file and said second log file to debug the software program.

22. The method according to claim 19, wherein the analyzing step is done by a compiler, and further comprising the step of utilizing a dump command to generate said file, said dump command causing an output of said listing.

23. A computer program product in a computer readable medium, said computer program product for debugging a software program, said computer program product comprising:
instruction means for analyzing said software program to determine a listing of executable functions in the software program;
instruction means fix generating a file including said listing of executable functions; and
instruction means for generating a debug script for a debug program utilizing said file.

24. The computer program product of claim 23, wherein the instruction means for generating a debug script comprises:
instruction means for utilizing said file, including said listing of executable functions, to generate script code which logs executable functions executed by said software program when said software program is executed under the control of said debug program.

25. The computer program product of claim 24, further comprising:
instruction means for setting at least one parameter used by the software program;
instruction means for executing said software program using said debug script to generate a first log file;
instruction means for changing the at least parameter and then re-executing said software program using said debug script to generate a second log file; and
instruction means for comparing said first log file and said second log file to debug the software program.

26. The computer program product according to claim 23, wherein the instruction means for analyzing said software program is a compiler, and further comprising a dump command means for generating said file, said dump command means causing an output of said listing.

* * * * *

UNITED STATES PATENT AND TRADEMARK OFFICE
CERTIFICATE OF CORRECTION

PATENT NO. : 6,966,051 B2
APPLICATION NO. : 09/864109
DATED : November 15, 2005
INVENTOR(S) : McBrearty et al.

It is certified that error appears in the above-identified patent and that said Letters Patent is hereby corrected as shown below:

Col. 8, line 17: after "log" insert --file--.

Col. 8, line 56: after "plurality" delete "of said plurality".

Col. 9, line 42: after "plurality" delete "of said plurality".

Col. 10, line 25: after "means" delete "fix" and insert --for--.

Signed and Sealed this

Sixth Day of February, 2007

JON W. DUDAS
*Director of the United States Patent and Trademark Office*